United States Patent [19]

Kramer

[11] Patent Number: 5,068,846
[45] Date of Patent: Nov. 26, 1991

[54] REFLECTIVE, OPTICAL RECORD CARRIER

[75] Inventor: Pieter Kramer, Eindhoven, Netherlands

[73] Assignee: U.S. Philips Corporation, New York, N.Y.

[21] Appl. No.: 858,550

[22] Filed: Apr. 23, 1988

Related U.S. Application Data

[63] Continuation of Ser. No. 146,554, May 5, 1980, abandoned, which is a continuation of Ser. No. 949,919, Oct. 10, 1978, abandoned, which is a continuation of Ser. No. 772,914, Feb. 28, 1977, abandoned, which is a continuation of Ser. No. 344,867, Mar. 26, 1973, abandoned.

[30] Foreign Application Priority Data

Sep. 2, 1972 [NL] Netherlands .................. 7211999

[51] Int. Cl.⁵ .................... G11B 7/24; H04N 5/85
[52] U.S. Cl. ................... 369/275.1; 358/342; 369/275.5; 369/109
[58] Field of Search ............ 358/342; 365/113, 120; 369/275, 109, 93–94, 125, 107, 111, 275.1, 275.4, 275.5, 275

[56] References Cited

U.S. PATENT DOCUMENTS

| | | | |
|---|---|---|---|
| 1,898,040 | 2/1933 | Eldred . | |
| 1,967,882 | 7/1934 | Hammond . | |
| 2,092,892 | 9/1937 | Runge . | |
| 2,595,670 | 5/1952 | Goehner | 369/125 |
| 3,174,140 | 3/1965 | Hagopian et al. . | |
| 3,430,966 | 3/1969 | Gregg . | |
| 3,518,442 | 6/1970 | Johnson . | |
| 3,534,166 | 10/1970 | Korpel | 358/129 |
| 3,626,386 | 12/1971 | Feinleib . | |
| 3,636,526 | 1/1972 | Feinleib . | |
| 3,665,425 | 5/1972 | Feinleib . | |
| 3,665,483 | 5/1972 | Becker et al. | 369/275.5 |
| 3,696,344 | 10/1972 | Feinleib et al. . | |
| 3,764,759 | 10/1973 | Herriger et al. . | |
| 3,795,902 | 3/1974 | Russell . | |
| 3,833,769 | 9/1974 | Compaan et al. | 369/44.24 |
| 3,838,401 | 9/1974 | Graf et al. | 369/109 |
| 3,848,095 | 11/1974 | Wohlmut et al. . | |
| 3,876,841 | 4/1975 | Kramer et al. | 369/44.24 |
| 3,876,842 | 4/1975 | Bouwhuis | 369/44.37 |
| 3,999,009 | 12/1976 | Bouwhuis . | |
| 4,010,317 | 3/1977 | Bouwhuis | 369/44.24 |
| 4,041,530 | 8/1977 | Kramer et al. . | |

FOREIGN PATENT DOCUMENTS 1038593 8/1966 United Kingdom .

OTHER PUBLICATIONS

"Long Play Video Disc with Optical Scanning", Funk Technik, No. 19, pp. 692–694, Oct. 1972.
"Philips TV Disk, Read by Light Beam, Could Shape Market", Electronics, Sep. 11, 1972, pp. 29–30.
Rice et al., An Experimental Television Recording and Playback System Using Photographic Discs, Journal of the SMPTE, vol. 79, No. 11, 11/70, pp. 997–1002.

Primary Examiner—Robert Weinhardt
Attorney, Agent, or Firm—Algy Tamoshunas; Leroy Eason

[57] ABSTRACT

A record carrier for information, for example video and/or audio information, in the form of a disk-shaped carrier substrate provided with an optical structure in accordance with the information is described. By making the optical structure radiation-reflecting and the substrate radiation-transmitting, whilst the surface of the substrate more remote from the optical structure forms both the entrance face and the exit face for the read radiation, and by coating a surface of the optical structure more remote from the substrate with an additional layer, a simple record carrier is obtained which is well protected against dust particles and damage.

7 Claims, 3 Drawing Sheets

REFLECTIVE, OPTICAL RECORD CARRIER

This application is a continuation of Ser. No. 146,554, filed May 5, 1980, which is a continuation of Ser. No. 949,919, filed Oct. 10, 1978, which is a continuation of Ser. No. 772,914, filed Feb. 28, 1977, which is a continuation of Ser. No. 344,867, filed Mar. 26, 1973, all such prior applications having been abandoned. This application is, further, a continuation-in-part of Ser. No. 229,285, filed Feb. 25, 1972, abandoned, which was continued as application Ser. No. 396,399, filed Sept. 12, 1973, abandoned, which was continued as application Ser. No. 618,215, filed Sept. 30, 1975, and issued as U.S. Pat. No. 4,041,530, dated Aug. 9, 1977.

The invention relates to a record carrier for information, for example video and/or audio information, in the form of a disk-shaped carrier substrate on which an optical structure is provided in accordance with the information, which record carrier is intended to be read by means of optical radiation. The invention also relates to an apparatus for reading the record carrier.

Such a record carrier and read apparatus are known and are described, inter alia, in "Journal of the S.M.P.T.E." 79(November 1970) pages 997–1002. In the known record carrier the information is stored in analog form, for example in the form of areas which have different absorption coefficients and are arranged in tracks. This registration carrier is read in the transmission mode in which a read beam enters the carrier on the side of the optical structure and emerges from it on the opposite side. In its passage through the carrier the beam is modulated by the structure in accordance with the information stored in it. The modulated beam is converted into an electric signal by a radiation-sensitive detector.

Because a large amount of information is stored on the record carrier, the details of the optical structure are very small, if, for example, a video program having a duration of 45 minutes is stored on a disk record carrier having an outer diameter of 30 cm, the side of the details will be of the order of 1 $\mu$m. Reading such a fine structure is highly susceptible to dust particles, fluff and the like. If these small objects lie on the optical structure, they may cover a large number of adjacent tracks and details in these tracks, preventing the latter from being read. In addition there is a very real possibility that, for example when the record carrier is handled or placed in the read apparatus, scratches and the like are made in the optical structure. Because the record carrier is intended to be played back in non-ideal circumstances, for example in the living room, provisions must be made to render the optical structure more or less unsusceptible to dust and damage.

The aforementioned paper proposes to coat the optical structure with an additional transparent layer. This is done to ensure that dust particles screen off only part of the read beam focussed on the optical structure of the record carrier. However, this requires the protective layer to have a minimum thickness of the order of many times the depth of focus of the lens used, for example a thickness of 100 $\mu$m. Moreover, the protectice layer must intimately engage the optical structure, preventing the occurrence of local air bubbles between the optical structure and the protective layer.

In the known apparatus it is attempted to maintain the focus of the objective which focusses the read beam on the optical structure by causing the objective to "fiont" on an air cushion on the record carrier. This pre-supposes, however, that the thickness of the protective layer is constant throughout the entire surface, or at least that it contains no variations in excess of the depth of focus of the objective, which is of the order of 1 $\mu$m. Consequently the protective layer has to satisfy exacting requirements.

It is an object of the present invention to provide a record carrier in which the optical structure is protected against dust particles and damage without the use of a protective layer which is required to satisfy stringent requirements. For this purpose the record carrier according to the invention is characterized in that the optical structure is a radiation-reflecting structure and the carrier substrate is radiation-transmitting, the surface of the carrier substrate more remote from the optical structure forming both the entrance face and the exit face for the read radiation. In this record carrier the carrier substrate itself ensures that dust particles are sufficiently spaced away from the optical structure.

According to a further feature of a record carrier according to the invention, the surface of the optical structure more remote from the carrier substrate is provided with an additional layer. Because the optical structure is completely embedded between two layers, it cannot readily be damaged.

The optical structure is read in the reflection mode, which means that the read beam is modulated by reflection at the optical structure. The additional layer is not traversed by the read beam and is only required to protect the optical structure from damage. Hence this layer need not satisfy exacting requirements. It need not be radiation-transmissive and need not have a constant thickness throughout its surface. In addition, it need not accurately engage the optical structure. It may, for example, be a plate which is secured to the carrier substrate along the edge.

The reflecting optical structure may be in the form of co-planar radiation-reflecting regions and intermediate areas, the areas having a coefficient of reflection different from that of the regions. Preferably, however, the optical structure consists of regions and intermediate areas having equally high reflection coefficients but situated at different levels.

The record carrier according to the invention differs from the known record carrier not only in construction but also in the manner in which during reading the read beam is maintained in focus on the optical structure. The flatness of the carrier substrate also which is required when employing the known method (an objective supported by an air cushion) can only be achieved by painstaking polishing. This greatly increases the cost of the disk. Optical determination according to the invention of the deviation between the plane of the optical structure and the plane in which the beam of radiation is focussed enables the range of permissible thickness variations over the carrier substrate to be extended to, for example, 300 $\mu$m.

Embodiments of the invention will now be described, by way of example, with reference to the accompanying diagrammatic drawings, in which.

Figure 1:
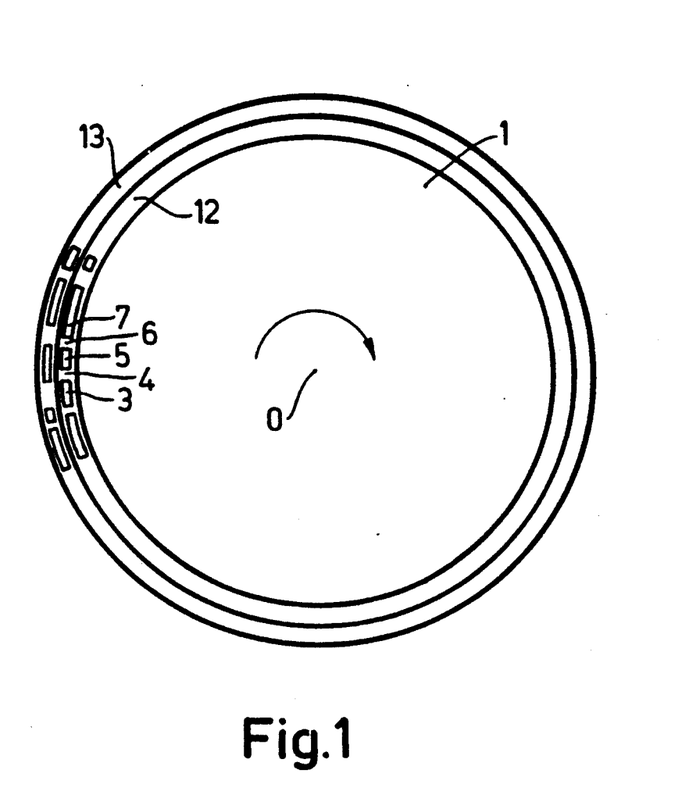
FIG. 1 is a plan view of a record carrier not coated with an additional layer.

FIG. 1 is a plan view of a circular record carrier. The carrier may contain a spiral structure comprising a plurality of quasi-concentric tracks. As an alternative, the tracks may be concentric, as is shown in FIG. 1. Only parts of two adjacent tracks denoted by 12 and 13 are shown. Each of the tracks contains, for example, a crenellated structure comprised of depressions which are spaced apart by intermediate areas or lands in the track direction, the dimensions of which are shown greatly exaggerated in FIG. 2, which is a tangential sectional view of a record carrier according to the invention. The spacings between, and the length of, the upper surfaces 3 and 5, 5 and 7, and so on of the merlons are different. Their heights 4, 6, and so on are equal to one another and, preferably, to about one quarter wavelength of the radiation used for reading. Instead of perpendicular leading and trailing edges the optical structure may alternatively have smooth transitions between the upper and lower surfaces.

Figure 2:
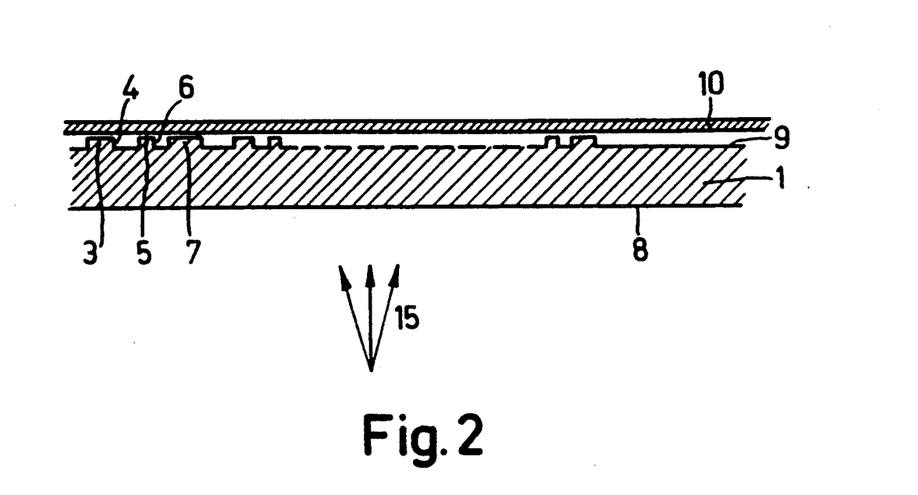
FIG. 2 is a cross-sectional view of an embodiment of a record carrier according to the invention.
Figure 4:
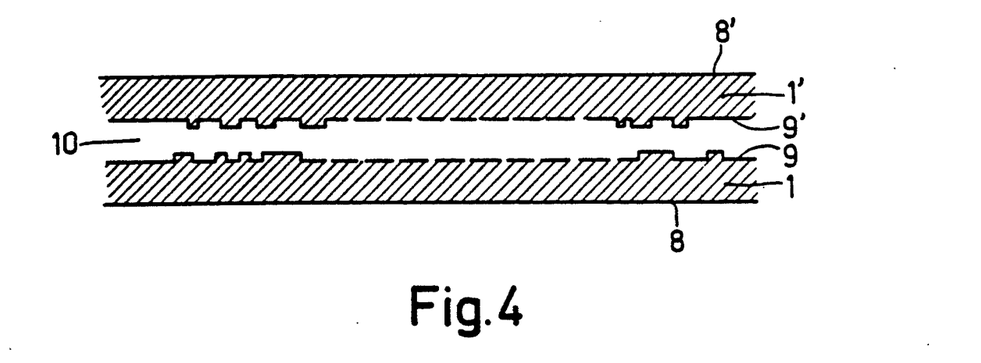
FIG. 4 is a cross-sectional view of a second embodiment of a record carrier according to the invention.

The carrier substrate 1 transmits the radiation used for reading. The optical structure is provided on the upper surface of the disk, whilst the lower surface acts both as the entrance surface for the unmodulated beam and as the exit surface for the modulated beam. The faces of the optical structure have been made highly reflecting, for example in that after the structure has been pressed in the substrate a metal layer is deposited on it from vapour. The thickness of this metal layer is not of importance. A protective layer 10 is provided on top of the optical structure. The only purpose of this layer is to protect the optical structure of the record carrier against damage. Hence any layer which provides protection against rough handling of the carrier may be used. As FIG. 2 shows, the layer may be a thin disk which is spaced from the optical structure and is secured to the substrate along the edge only. In addition, a sheet of paper or a foil of a synthetic material provided with an adhesive on one surface may be stuck onto the optical structure. As an alternative, as is shown in FIG. 4, the layer, for example a sprayed layer of lacquer, may be provided on and between the merlons, in which case the thickness of the layer must be greater than the height of the merlons. Because the optical structure lies between the substrate 1 and the layer 10 it is fairly capable of withstanding rough handling.

A read beam (15) is modulated in phase by the crenellated structure shown in FIG. 2. As an alternative, the upper surface 9 of the substrate may be provided with a structure of radiation-reflecting regions and radiation-absorbing intermediate areas, causing the read beam to be modulated in amplitude.

Figure 3:
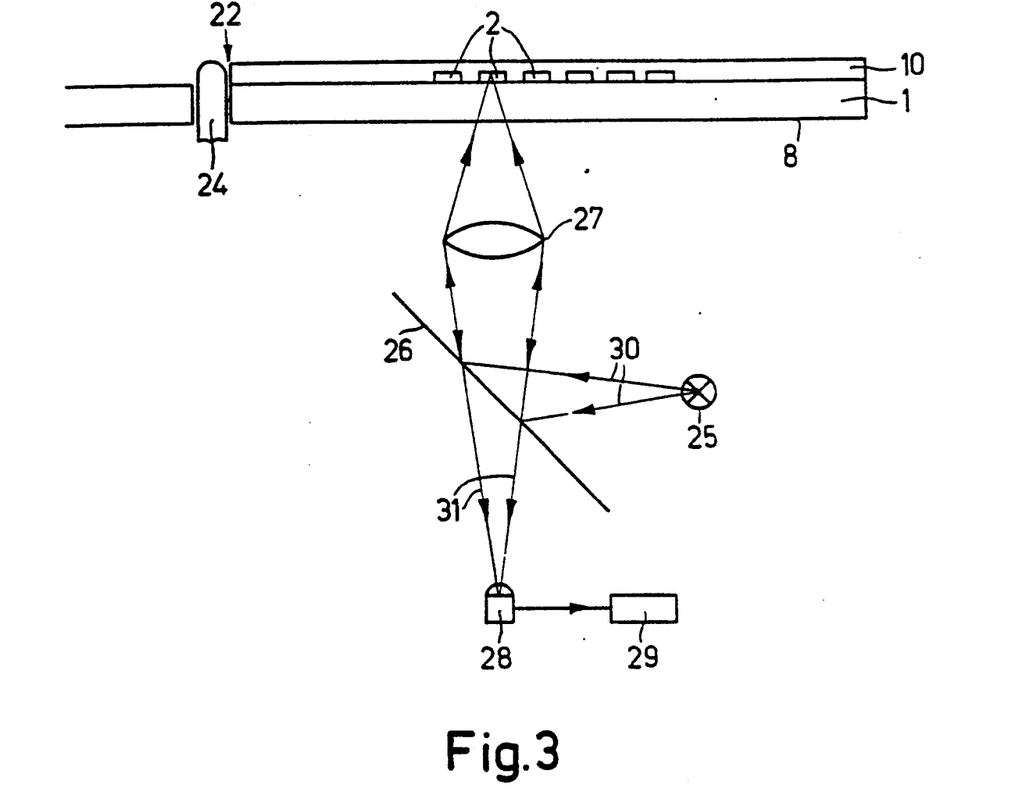
FIG. 3 is a known apparatus for reading the record carrier.

When the disk record carrier shown in FIG. 1 is to be read, it is rotated at a speed of, for example, 1500 revolutions per minute by means of a driving spindle 24, as is shown in FIG. 3. In this Figure the record carrier is shown in radial section. A read beam 30 emitted by a source of radiation 25 is reflected to the record carrier by a half-silvered mirror 26. The beam passes through the carrier substrate 1 to be reflected at the optical structure (shown as tracks 2) on the upper surface of the disk. An objective 27 forms an image of the source on the optical structure, the size of this image being of the order of the smallest detail of the structure.

During rotation of the record carrier the read beam is modulated in time in accordance with the sequence of, for example, the merlons in a track. The modulated read beam 31 passes through the half-silvered mirror 26 to be intercepted by a radiation-sensitive detector 28. At the output of the detector an electric signal is produced which corresponds to the information stored in the record carrier. The detector 28 may be connected to known electronic means for converting the output signal of the detector into picture and sound.

The advantages of reading in reflection will be clear from FIG. 3. All the optical elements and the electronic processing devices are disposed on one side of the record carrier, permitting the carrier to be readily placed in the read apparatus. Moreover the elements may be incorporated so as to be well protected. Furthermore the number of optical elements may be reduced, because some elements are used twice. The reduced number of elements results in a reduced likelihood of relative oscillations.

Also, the record carrier may be read in a non-dustfree room, for example a living room, for dust particles deposited on the layer 10 have no effect, because the read beam does not pass through this layer. A dust particle on the lower surface 8 of the substrate may reduce the intensity of the radiation incident on the optical structure. However, a reduction in intensity is not highly inconvenient, because the information is recorded in digital form. A dust particle cannot entirely intercept the beam, because the beam has a comparatively large diameter in the plane of the dust particle. This is due to the fact that the substrate by nature has a certain thickness, inter alia because of the desired rigidity.

If the record carrier is to be suitable for manufacture by mass production methods, the flatness of the substrate should not have to satisfy exacting requirements. However, because the depth of focus of the objective 27 is of the order of 1 $\mu$m, variations in the thickness of the substrate may cause parts of the optical structure to become located outside the focussed light spot at the sites of these variations. These thickness variations, which cannot be compensated for by an objective floating on an aircushion, may cause the detector to receive not only radiation from the track part to be read, but also radiation from the surroundings of this part. As a result, the modulation depth of the output signal from the detector is reduced, while moreover, because not one track only but adjacent tracks are also illuminated, crosstalk may occur.

According to the invention the record carrier described may be used to advantage if during reading an optical focussing detection method is employed. For this purpose read apparatuses provided with focussing detection systems described in the patents identified below may be used. The use of the apparatuses for reading the record carrier according to the invention described in these patents means that the possibilities of the apparatuses described therein are particularly efficiently utilized.

Figure 5:
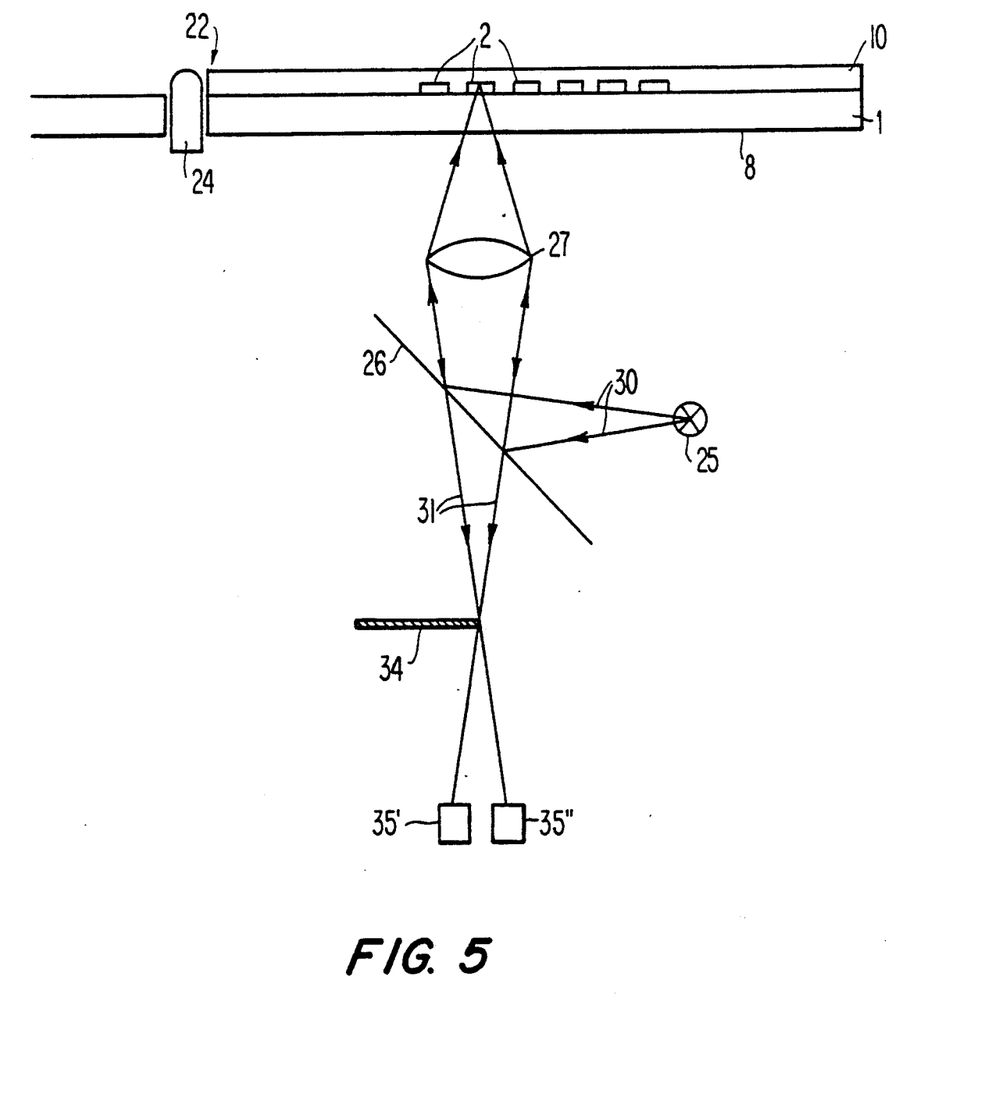
FIG. 5 shows an arrangement for detecting focusing errors during reading of information from the record carrier.

One such arrangement is illustrated in FIG. 5 wherein a screen 34 is disposed in the path of the reflected beam 31 at a position such that the detectors 35' and 35" receive equal amounts of radiation when the beam is properly focused on the reflective optical stryucture. If, on the other hand, the plane of the optical structure shifts from the desired position, the screen will intercept the rays which travel to one of the detectors so that said one detector will receive less radiation than the other. The amount and direction that the plane of the reflective optical structure deviates from the desired position can thus be determined by comparison of the output signals from the detectors 35' and 35".

An optical determination of the deviation between the plane of the optical structure and the plane in which the read beam is focussed may be effected by imaging a grating constituted by adjacent tracks of the optical structure on two physical gratings spaced from the record carrier by different distances. The difference between the output signals of the detectors disposed behind the gratings indicates the magnitude and the direction of any deviation. A read apparatus including such focussing detection is described in U.S. Pat. No. 3,833,769.

A second possibility is offered by the apparatus described in U.S. Pat. No. 4,010,317 in which two detectors are arranged side by side, viewed in the direction of length of the track. The detectors intercept two different parts of the modulated beam.

As an alternative, the deviation between the plane of the optical structure and the plane in which the read beam is focussed may be detected without using the details in the optical structure, in contradistinction to the two aforementioned apparatuses. In such a method the optical structure is used only as a reflecting face, as is described in U.S. Pat. No. 3,876,841 and U.S. Pat. No. 3,876,842. By means of, inter alia, this face an image of an object is formed, the location of this image being determined by the location of the plane of the reflecting optical structure.

FIG. 4 shows a second embodiment of a record carrier according to the invention. Two substrates 1 and 1' which each have an optical structure on one surface 9 and 9' respectively are combined with an intermediate layer 10 to form an integral unit. Such a record carrier may be manufactured by methods known from the technology of disk-shaped sound records. The structures on the surfaces 9 and 9' are read by means of beams in opposite directions. In this embodiment the layer 10 is only required to separate the optical structures and need not protect them against external influences.

In the record carrier shown in FIG. 4 the two halves of one program may be stored in the two optical structures.

The record carrier shown in FIG. 4 is eminently suitable to realize a further inventional idea. According to this idea information about the same colored pictures is stored in different color codes in two optical structures of one record carrier. In one of these optical structures the program may be recorded, for example, according to the PAL-standard and in the other optical structure according to the Secam-standard or the NTSC-standard. The advantage is that the same information on one record carrier may be used in a large geographic area in spite of the fact that different apparatuses are used for rendering pictures and sound visible and audible respectively.

What is claimed is:

1. A record carrier containing information which is readable by a beam of radiation, said record carrier comprising a disc-shaped, radiation-transmitting substrate having a pair of planar surfaces on opposite sides thereof, a non-transmissive, radiation reflecting optical structure on one of said planar surfaces of said substrate, said optical structure comprising a plurality of adjacent, circular tracks extending about the center of said substrate and defining turns of a spiral or concentric circles spaced from each other in the radial direction, each circular track having a plurality of depressions in said one surface of said substrate, said depressions being spaced apart in the track direction by intermediate areas, and a reflective layer extending over said intermediate areas and said depressions so that upon illumination by a convergent beam of radiation which is projected on and enters through the other of said planar surfaces and which passes through said substrate and is focussed on said optical structure to a spot of a size of the order of the smallest detail of said optical structure, the radiation is modulated by said depressions and intermediate areas in accordance with the sequence thereof and the modulated radiation is reflected by said reflective layer towards and exists through said other planar surface, said substrate defining a substantially rigid support for said optical structure and having a thickness such that in the plane of said other surface, which forms the entrance and exit faces for the radiation, the diameter of the beam is sufficiently larger than the diameter of said spot so that dust particles, scratches and the like on said other surface, do not interfere with readout of information by the convergent beam focussed to said spot on said optical structure, and an additional layer secured to the side of said substrate remote from said other surface, said optical structure being disposed between said substrate and said additional layer so that it is protected from damage during handling.

2. The record carrier according to claim 1 wherein said depressions are pressed into said one surface of said substrate and said reflective layer is metallic and is deposited on said one surface.

3. The record carrier according to claim 1 or 2 wherein the thickness of said additional layer is substantially smaller than the thickness of said substrate.

4. The record carrier according to claim 2 wherein said reflective, metallic layer is deposited on said one surface from vapour.

5. The record carrier according to claim 4 wherein said additional layer is a layer of lacquer sprayed on said optical structure.

6. An apparatus for reading information stored on a record carrier having a disk-shaped radiation transmitting substrate with a pair of parallel, planar surfaces on opposite sides thereof and a non-transmissive, radiation reflecting optical structure disposed on one of said planar surfaces, said optical structure comprising a plurality of adjacent, circular tracks extending about the center of the substrate and defining turns of a spiral or concentric circles spaced from each other in the radial direction, each circular track having a plurality of depressions spaced apart by intermediate areas in the track direction, said apparatus comprising means for supporting the record carrier for rotation about the center of the substrate in a plane parallel to the plane of said one surface, means positioned on the side of said substrate remote from said optical structure for producing a beam of radiation which is projected onto the other surface of said substrate so that the radiation passes through said substrate and is incident on said reflective optical structure, an objective system for focusing said beam to a spot on said optical structure so that the radiation is modulated by said optical structure in accordance with information stored thereby and the modulated radiation is reflected by said optical structure back through said other surface and passes through said objective system, said substrate having a thickness such that in the plane of said other surface the diameter of the beam is sufficiently larger than the diameter of said spot so that dust particles, scratches and the like on said other surface do not interfere with readout of information by the beam focussed to said spot on said optical structure, radiation-sensitive means for converting the modulated radiation into an electrical signal, said radiation sensitive means being disposed in the path of the modulated radiation reflected by the optical structure, and means for deriving from the radiation a signal indicative of a deviation of the plane of the optical structure from the plane at which the radiation is focused by said objective system for correcting the focusing.

7. A record carrier containing information which is readable by a beam of radiation, said record carrier comprising a pair of disc-shaped, radiation-transmitting substrates each having a pair of planar surfaces on opposite sides thereof, a non-transmissive, radiation reflecting optical structure on one of said planar surfaces of each substrate, said optical structures each comprising a plurality of adjacent, circular tracks extending about the center of said substrate and defining turns of spiral or concentric circles spaced from each other in the radial direction, each circular track having a plurality of depressions which are spaced apart in the track direction by intermediate areas, said substrates being disposed in a superposed relationship with said optical structures being adjacent each other so that upon illumination of said one optical structure by a beam of radiation which is projected on and enters through the other of said planar surfaces of the associated substrate and which passes through said associated substrate and is focussed on said one optical structure to a spot of a size of the order of the smallest detail of the optical structure, the radiation is modulated by said depressions and intermediate areas in accordance with the sequence thereof and the modulated radiation is reflected by said one optical structure towards and exits through said other planar surface of said associated substrate, each substrate defining a substantially rigid support for the respective optical structure and having a thickness such that in the plane of said other surface, which forms the entrance and exit faces for the radiation, the diameter of the beam is sufficiently larger than the diameter of said spot so that dust particles, scratches and the like on said other surface, do not interfere with readout of information by the convergent beam focussed to said spot on said optical structure.

* * * * *

UNITED STATES PATENT AND TRADEMARK OFFICE
Certificate

Patent No. 5,068,846                                      Patented: November 26, 1991

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peiter Kramer, Eindhoven, Netherlands; and Gijsbertus Bouwhuis, Eindhoven, Netherlands.

Signed and Sealed this Tenth Day of April 2012.

*WAYNE YOUNG*
*Supervisory Patent Examiner*
Art Unit 2627
Technology Center 2600

(12) EX PARTE REEXAMINATION CERTIFICATE (5512th)
United States Patent
Kramer (10) Number: US 5,068,846 C1
(45) Certificate Issued: Sep. 19, 2006

(54) REFLECTIVE, OPTICAL RECORD CARRIER (75) Inventor: Pieter Kramer, Eindhoven (NL)

(73) Assignee: U.S. Philips Corporation, New York, NY (US)

Reexamination Request:
No. 90/007,336, Dec. 8, 2004

Reexamination Certificate for:
Patent No.: 5,068,846
Issued: Nov. 26, 1991
Appl. No.: 06/858,550
Filed: Apr. 23, 1986

Related U.S. Application Data (63) Continuation of application No. 06/146,554, filed on May 5, 1980, now abandoned, which is a continuation of application No. 05/949,919, filed on Oct. 10, 1978, now abandoned, which is a continuation of application No. 05/772,914, filed on Feb. 28, 1977, now abandoned, which is a continuation of application No. 05/344,867, filed on Mar. 26, 1973, now abandoned.

(30) Foreign Application Priority Data

Sep. 2, 1972 (NL) .............................................. 7211999

(51) Int. Cl.
*G11B 7/24* (2006.01)

(52) U.S. Cl. .............................. 369/275.1; 369/109.01; 369/275.5

(58) Field of Classification Search ................. 365/113, 365/120; 369/93–94, 107, 275.1, 111, 275.4, 369/125, 275.5, 109.1
See application file for complete search history.

(56) References Cited

U.S. PATENT DOCUMENTS

| | | |
|---|---|---|
| 1,898,040 A | 2/1933 | Eldred |
| 3,174,140 A | 3/1965 | Hagopian et al. |
| 3,198,880 A | 8/1965 | Toulon |
| 3,626,386 A | 12/1971 | Feinlieb |
| 3,635,551 A | 1/1972 | Szymber |

*Primary Examiner*—Minh Nguyen (57) ABSTRACT

A record carrier for information, for example video and/or audio information, in the form of a disk-shaped carrier substrate provided with an optical structure in accordance with the information is described. By making the optical structure radiation-reflecting and the substrate radiation-transmitting, whilst the surface of the substrate more remote from the optical structure forms both the entrance face and the exit face for the read radiation, and by coating a surface of the optical structure more remote from the substrate with an additional layer, a simple record carrier is obtained which is well protected against dust particles and damage.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 7 is confirmed.

\* \* \* \* \*